United States Patent
Legatski et al.

(10) Patent No.: US 12,506,844 B1
(45) Date of Patent: Dec. 23, 2025

(54) DETERMINING PRIORITIZED PARTICIPANTS DURING A VIDEO CONFERENCE

(71) Applicant: Zoom Communications, Inc., San Jose, CA (US)

(72) Inventors: Richard Dean Legatski, Castle Rock, CO (US); Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 273 days.

(21) Appl. No.: 18/298,668

(22) Filed: Apr. 11, 2023

(51) Int. Cl.
| | |
|---|---|
| *H04N 7/15* | (2006.01) |
| *G06F 3/01* | (2006.01) |
| *G06F 3/0484* | (2022.01) |
| *H04N 7/14* | (2006.01) |

(52) U.S. Cl.
CPC ............ *H04N 7/152* (2013.01); *G06F 3/017* (2013.01); *G06F 3/0484* (2013.01); *H04N 7/147* (2013.01); *H04N 7/155* (2013.01)

(58) Field of Classification Search
CPC ........ H04N 7/152; H04N 7/147; H04N 7/155; H04N 7/15; H04N 7/14; G06F 3/017; G06F 3/0484; G06F 3/01
See application file for complete search history.

(56) References Cited

U.S. PATENT DOCUMENTS

| | | | |
|---|---|---|---|
| 8,477,174 B2 | 7/2013 | Michaelis | |
| 8,817,966 B2 | 8/2014 | Wrench | |
| 9,154,730 B2 | 10/2015 | Lee et al. | |
| 10,304,208 B1 | 5/2019 | Chandler et al. | |
| 10,769,858 B2 | 9/2020 | Browy et al. | |
| 11,019,308 B2 | 5/2021 | Bright-Thomas et al. | |
| 11,055,521 B2 | 7/2021 | Chandler et al. | |
| 2007/0291667 A1 | 12/2007 | Huber et al. | |
| 2016/0072862 A1* | 3/2016 | Bader-Natal | H04N 7/15 715/755 |
| 2019/0174096 A1* | 6/2019 | Harpur | G06V 40/174 |

* cited by examiner

*Primary Examiner* — Yosef K Laekemariam
(74) *Attorney, Agent, or Firm* — Young Basile Hanlon & MacFarlane, P.C.

(57) ABSTRACT

A system may receive, during a video conference, video feeds corresponding to conference participants. The system may determine a prioritized participant from the conference participants by using a machine learning model and historical conference participant information. In some implementations, the system may receive input from a conference participant that causes the conference participant to be a prioritized participant (e.g., the conference participant may self-select). The system may emphasize, in a graphical user interface (GUI) during the video conference, the video feed corresponding to the prioritized participant. In some implementations, determining the prioritized participant may include accessing a record including the historical conference participant information. The record may indicate that the prioritized participant and a participant using the GUI have a connection in an organization. In some implementations, the record may indicate that the prioritized participant used sign language during another video conference.

20 Claims, 10 Drawing Sheets

US 12,506,844 B1

DETERMINING PRIORITIZED PARTICIPANTS DURING A VIDEO CONFERENCE

FIELD

This disclosure relates generally to video conferences and, more specifically, to determining prioritized participants during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
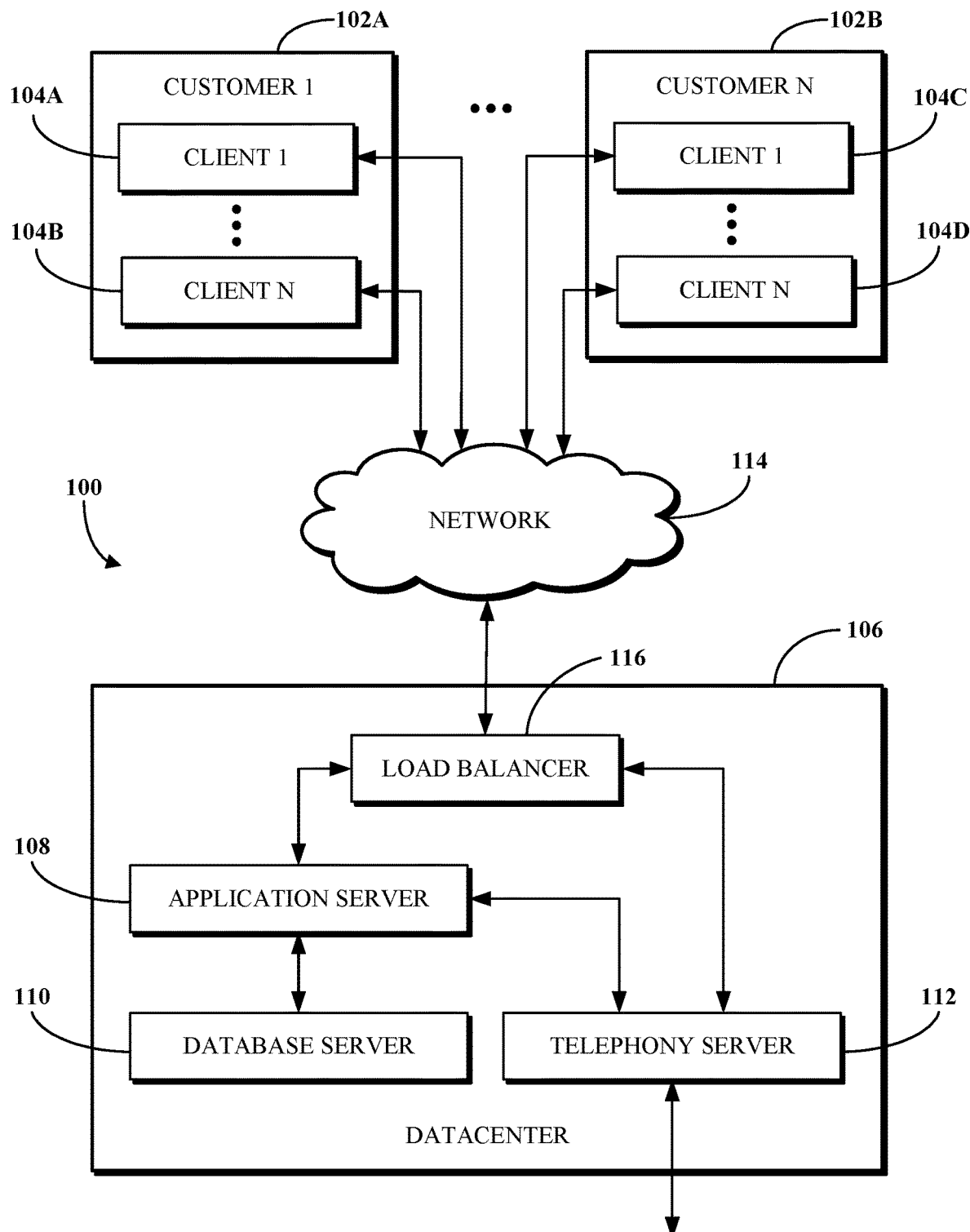
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Individuals may use software, such as of a UCaaS platform or otherwise, to communicate and collaborate remotely with one another in video conferences. During a video conference, video feeds associated with conference participants (also referred to herein as "participants" for brevity) may be displayed in a GUI alongside audio output for participant speech, so that the participants can see and hear one another. Conventional software services usable for video conferencing, such as those of UCaaS and other software platforms, may enable a participant to view the video feeds as thumbnails in a gallery, or view a single video feed linked to an active speaker. In some cases, the conventional software services may enable a participant to select a video feed of interest for static display during the video conference, so that the video feed does not change for that participant, and in some cases, anyone else in the video conference.

However, a participant may not recognize the optimal viewing for display of video feeds during a video conference (e.g., thumbnails in a gallery, or active speaker). Further, when a video conference involves many (e.g., 20, 30, or more) participants, the participant may be distracted by the number of participants in the video feeds and/or may have difficulty following conversations and understanding which participants made what statements. In some cases, participants in the video conference may be using sign language in a video feed in order to communicate, and due to the design limitations of the conventional software services focusing on audible content for indicating a "speaking" participant, a participant might not realize that such communication is occurring at all. Moreover, where sign language is being used, due to the number of languages (e.g., American Sign Language, French Sign Language, Chinese Sign Language, and the like), and dialect variations that exist, distinguishing sign language from the general body language of a speaker can be difficult.

Implementations of this disclosure address problems such as these by determining whether particular participants within a video conference should be emphasized in a GUI displayed to a participant during the video conference. This feature may require authorization of an account administrator prior to use. A system may receive, during a video conference, video feeds corresponding to conference participants. In some cases, one or more of the participants may be using sign language to communicate. The system may determine a prioritized participant from the conference participants by using a machine learning model to predict the prioritized participant. The machine learning model may predict the prioritized participant based on historical conference participant information. For example, the machine learning model may determine from the historical conference participant information that the prioritized participant is an individual that the participant should interact with, an individual that has similar interests to the participant, an individual that is deaf or hard of hearing (DHH), an individual that is a member of a same team, group, or project as the participant, or is a supervisor, manager, or teacher of the participant. In some implementations, the machine learning model may determine from the historical conference participant information that a conference participant used sign language during another video conference. The machine learning model may access one or more records to obtain the historical conference participant information. For example, the machine learning model may access a record to determine that a participant is likely to use sign language and may detect gestures from the participant during the video conference, via software-based image or audio analysis and processing, that are associated with sign language.

The system may emphasize, in the GUI during the video conference, the video feed corresponding to the prioritized participant without emphasizing the video feeds of conference participants that are not prioritized participants. For example, emphasizing a video feed may include highlighting a participant tile associated with the video feed in the GUI (e.g., when the participant is viewing the video feeds as thumbnails in a gallery) or increasing a size of participant tile in the GUI (e.g., when the participant is viewing video feeds linked to active speakers). In some implementations, the machine learning model may determine multiple prioritized participants from the conference participants, and emphasize, at the same time, the video feeds corresponding to the multiple prioritized participants. As a result, the system may enable a participant to better follow conversations during a video conference, and may enable participants of the video conference to be better understood.

To describe some implementations in greater detail, reference is first made to examples of hardware and software structures used to implement a system for determining prioritized participants during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
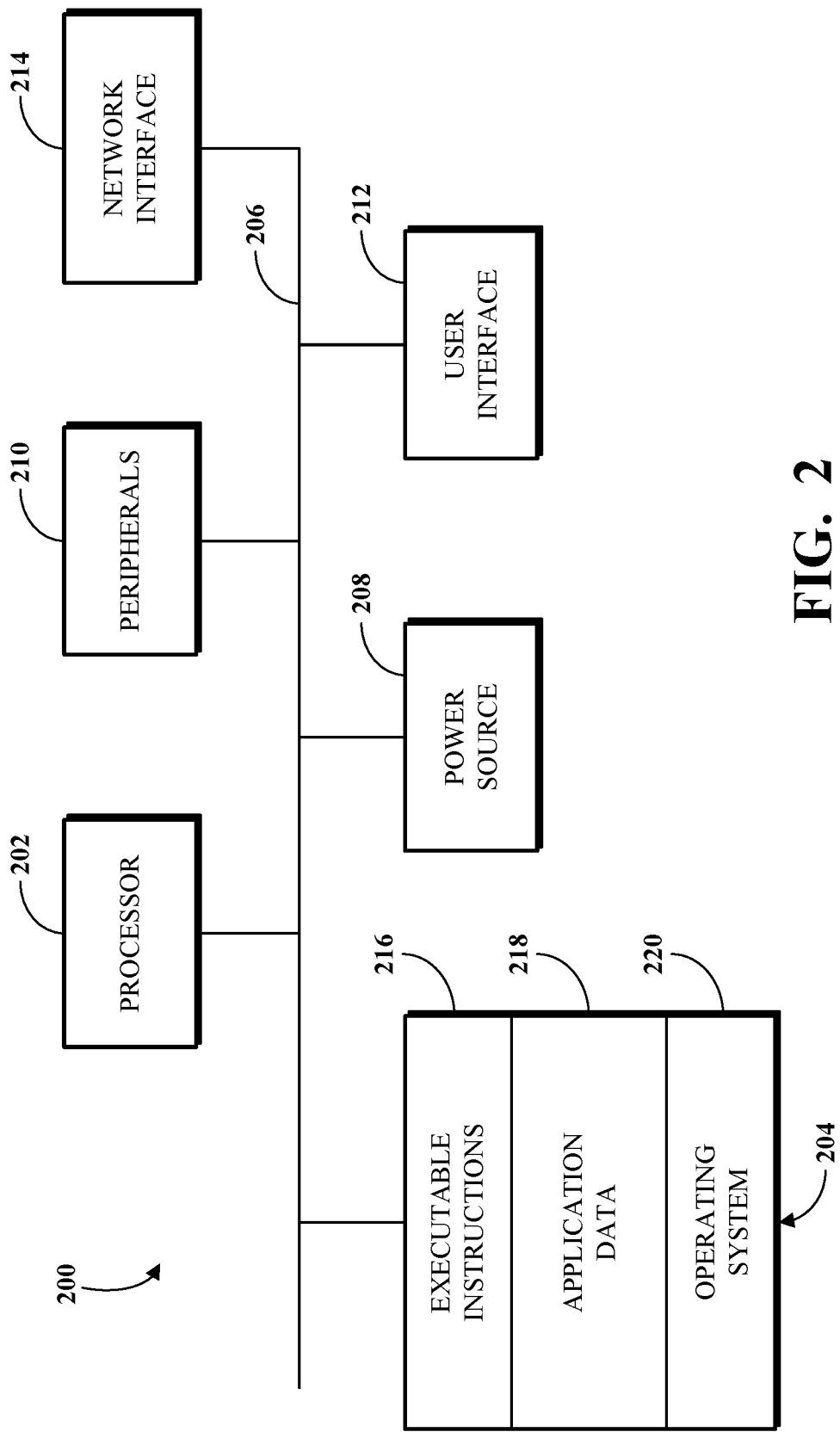
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
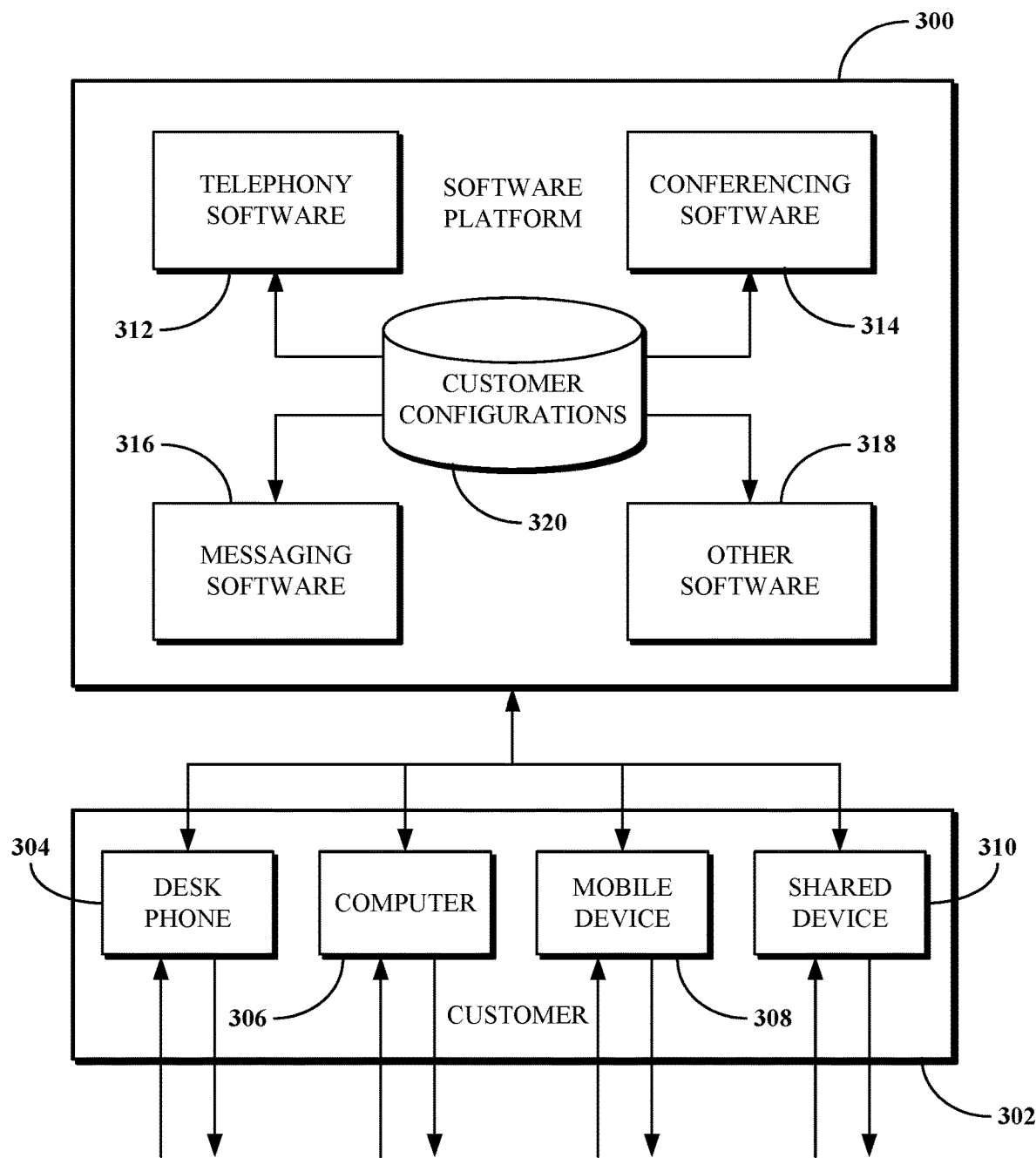
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include prioritization software, such as for determining prioritized participants during a video conference. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
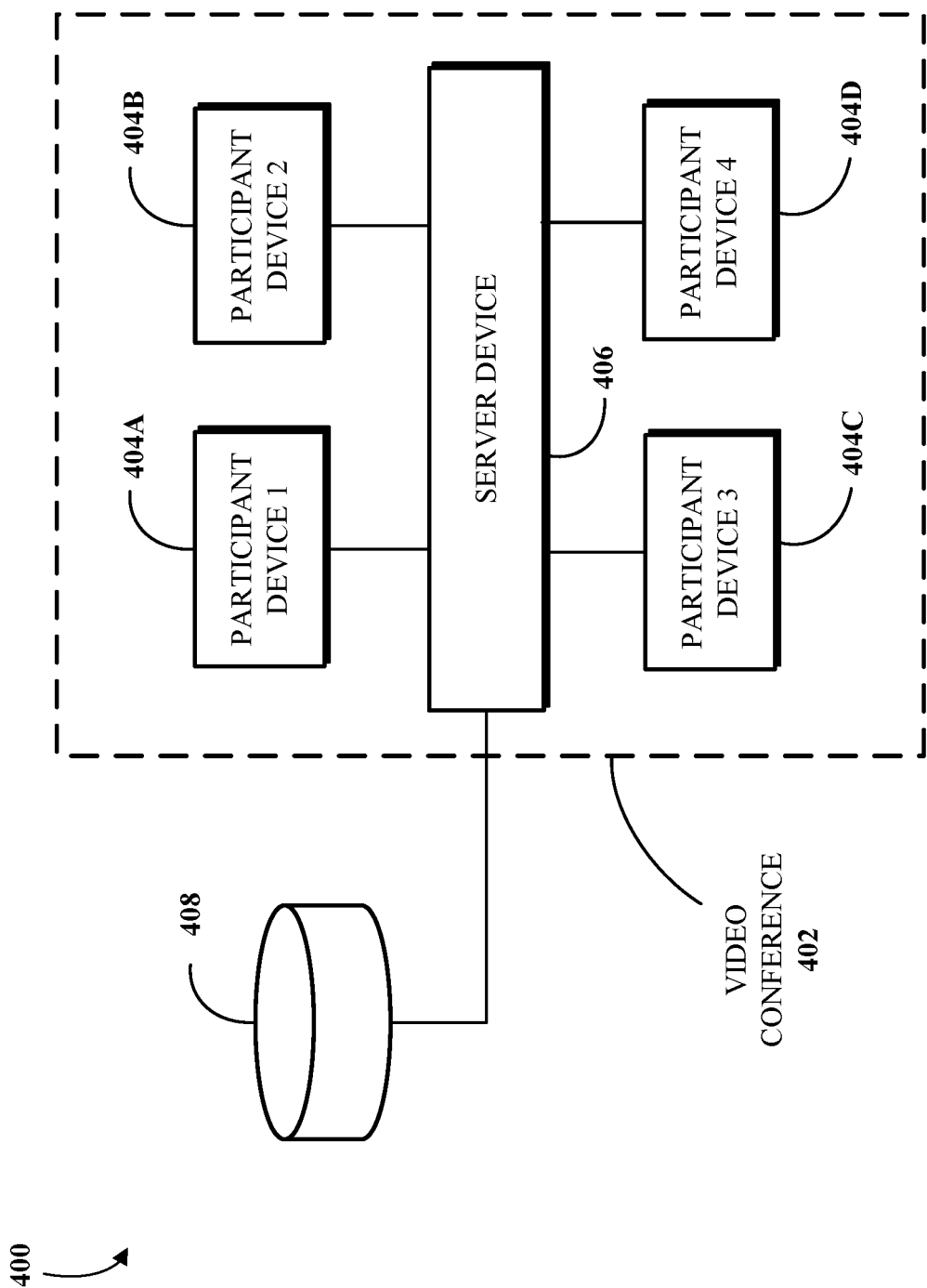
FIG. 4 is a block diagram of an example of a system that determines prioritized participants during a video conference.

FIG. 4 is a block diagram of an example of a system 400 that determines prioritized participants during a video conference 402. The video conference 402 may include multiple conference participants connected to the video conference 402 using participant devices, such as a first participant ("participant 1") using a participant device 404A, a second participant ("participant 2") using a participant device 404B, a third participant ("participant 3") using a participant device 404C, and a fourth participant ("participant 4") using a participant device 404D. Each of the participant devices 404A to 404D may be a client device such as one of the clients 104A through 104D shown in FIG. 1 or 304 through 310 shown in FIG. 3. A participant device such as the participant devices 404A to 404D may execute software (e.g., client-side conferencing software, which could, for example, be via a client application or a web application used to connect to a conference implemented using server-side conferencing software, such as the conferencing software 314 shown in FIG. 3) and may connect to a server device 406. The server device 406 may execute software (e.g., server-side conferencing software, such as the conferencing software 314) to support the video conference 402 between the participants using the participant devices 404A to 404D. For example, the server device 406 could be a server at the datacenter 106 shown in FIG. 1, such as the application server 108 or the telephony server 112. Although four participant devices 404A to 404D are shown and described by example, other numbers of participant devices may be used with the system 400. For example, in some cases, the video conference 402 may involve many (e.g., 20, 30, or more) participants using participant devices.

The participant devices 404A to 404D may enable individual participants to communicate and collaborate remotely with one another in the video conference 402. For example, the participants may use the participant devices 404A to 404D to send video data depicting themselves and audio data representing their speech to other participants and to receive video and audio data from the other participants. The server device 406 may receive, during the video conference 402, video feeds corresponding to the participants (e.g., a video feed 1 of participant 1 via the participant device 404A, a video feed 2 of participant 2 via the participant device 404B, a video feed 3 of participant 3 via the participant device 404C, and a video feed 4 of participant 4 via the participant device 404D). The video feeds may be displayed in a GUI used by a participant alongside audio output for participant speech. For example, the video feeds may be displayed in a first GUI associated with participant device 404A (e.g., for participant 1 to view), in a second GUI associated with participant device 404B (e.g., for participant 2 to view), in a third GUI associated with participant device 404C (e.g., for participant 3 to view), and in a fourth GUI associated with participant device 404D (e.g., for participant 4 to view).

The server device 406, and/or the participant devices 404A to 404D, may run prioritization software (e.g., the other software 318) to determine whether particular participants within the video conference 402 should be prioritized participants that are emphasized in the GUI of participant devices 404A to 404D. Running the prioritization software may include using a machine learning model 408 to predict the prioritized participants for a particular participant. The prediction may be based on historical conference participant information associated with the participants of the video conference 402. For example, for the second GUI used by participant 2, the machine learning model 408 may predict participant 1 to be a prioritized participant based on an connection between participant 1 and participant 2. The machine learning model 408 may also predict participant 4 to be a prioritized participant based on participant 4 being an individual that is DHH or using sign language to communicate (e.g., a silent active signer). As a result, participants 1 and 4 may be prioritized participants relative to participant 2.

In some implementations, a conference participant may provide input that causes the conference participant to be a prioritized participant that is emphasized in the GUI (e.g., the conference participant may self-select). For example, a conference participant may provide input to the server device 406 that indicates that the conference participant is an individual that is DHH or using sign language to communicate (e.g., a silent active signer, such as participant 4). Running the prioritization software may include receiving the input and determining that the particular participant that provided the input should be a prioritized participant within the video conference 402. As a result, a conference participant that is a first-time DHH participant could be immediately recognized in the video conference 402 as an individual that will be signing as opposed to speaking, and can be emphasized in the GUI accordingly.

The server device 406, and/or the participant devices 404A to 404D, may then emphasize in the GUI of a participant device, during the video conference 402, the video feeds corresponding to the prioritized participants. For example, relative to participant 2, the server device 406, and/or the participant devices 404B, may emphasize in the second GUI associated with participant device 404B the video feeds corresponding to participants 1 and 4 (without emphasizing the video feeds of other conference participants that are not prioritized participants, such as participant 3). Further, during the video conference, the machine learning model can update determinations of prioritized participants. For example, at a first time during the video conference 402, participants 1 and 4 may be prioritized, then at a second time during the video conference 402, participant 3 and 4 could be prioritized. As a result, a participant (e.g., participant 2) can better follow conversations during the video conference 402, and other participants (e.g., participant 1 and 4) can be better understood. For example, if participant 2 is an individual that is DHH, participant 2 could better follow a conversation involving participants 1 and 4 based the visual emphasis of their video feeds in the GUI.

Figure 5:
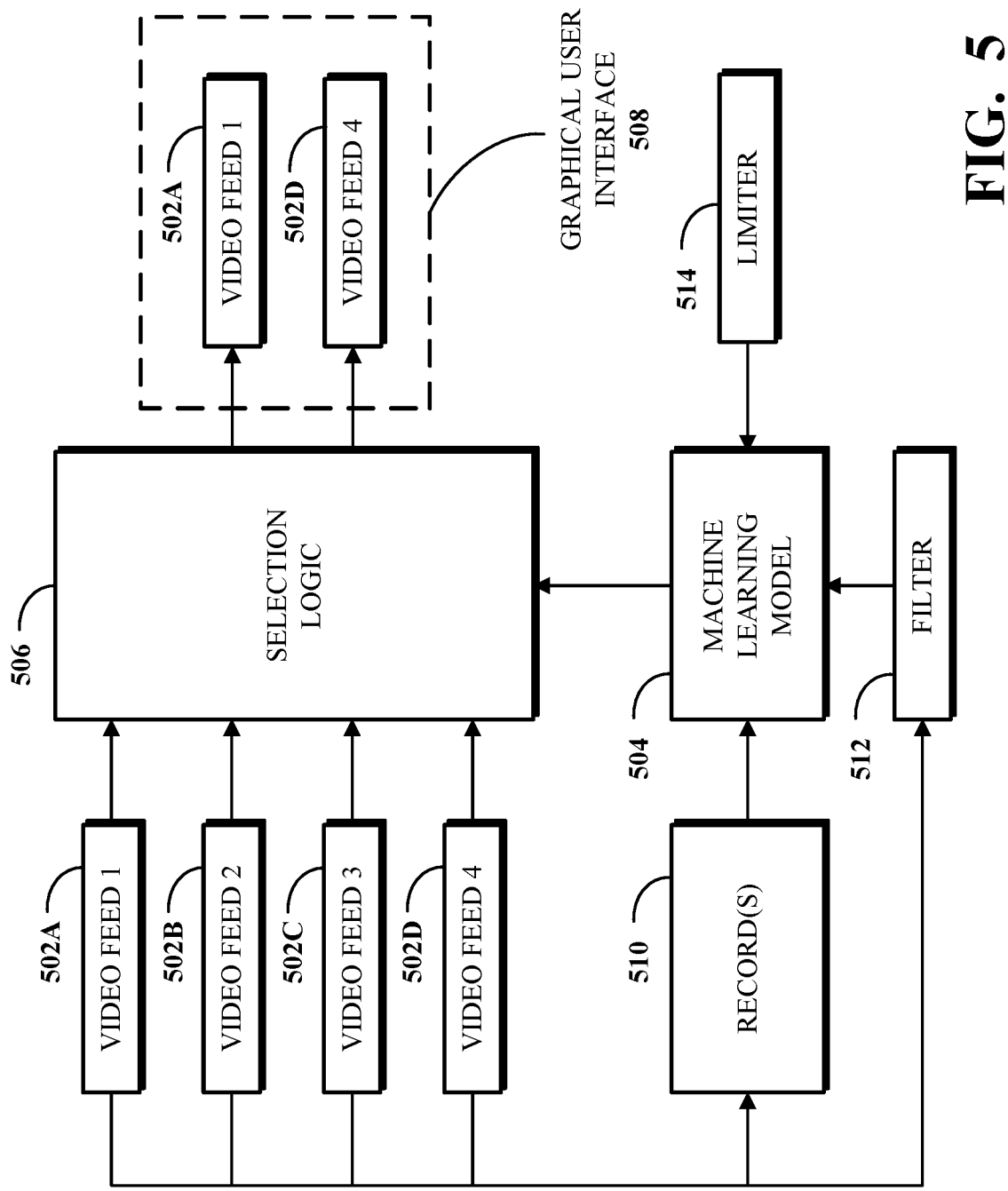
FIG. 5 is a block diagram of an example of software for determining prioritized participants during a video conference.

FIG. 5 is a block diagram of an example of software for determining prioritized participants during a video conference, such as the video conference 402 of FIG. 4. A system, such as the server device 406 and/or the participant devices 404A to 404D, may run the prioritization software (e.g., the other software 318) to receive video feeds corresponding to conference participants, such as video feeds 502A to 502D. For example, video feed 502A could correspond to the video feed 1 of participant 1 using the participant device 404A, video feed 502B could correspond to the video feed 2 of participant 2 using the participant device 404B, video feed 502C could correspond to the video feed 3 of participant 3 using the participant device 404C, and video feed 502D could correspond to the video feed 4 of participant 4 using the participant device 404D. The system can use the machine learning model 504 to determine, for a particular participant, prioritized participants from the conference participants of the video conference. For example, the system can determine, for participant 2, prioritized participants from among the participants 1, 3 and 4. The machine learning model 504 may be like the machine learning model 408 of FIG. 4.

The machine learning model 504 may generate predictions that configure selection logic 506 to output video feeds of prioritized participants to a GUI 508 of a particular participant during the video conference. For example, the machine learning model 504 may generate a prediction that configures the selection logic 506 to output video feed 502A and video feed 502D, to prioritize participants 1 and 4, to a GUI of a participant 2 during the video conference (e.g., the GUI 508 could be the second GUI associated with participant device 404B).

The machine learning model 504 may predict the prioritized participants (e.g., participants 1 and 4) based on historical conference participant information. In some cases, the machine learning model 504 may access one or more records 510, corresponding to one or more of the conference participants, to obtain the historical conference participant information. For example, the machine learning model 504 may access a first record of the records 510 that includes historical conference participant information associated with participant 1. The first record may indicate that participant 1 and the participant using the GUI (e.g., participant 2) have a connection in an organization, or that participant 1 is an individual that the participant 2 should interact with, or an individual that has similar interests to participant 2, or an individual that is a member of a same team, group, or project as participant 2, or is a supervisor, manager, or teacher of participant 2 (e.g., an indication in the record of a student/teacher or supervisor/subordinate relationship). As a result, the machine learning model 504 may predict that participant 1 should be a prioritized participant for participant 2, and may cause the selection logic 506 to emphasize the video feed 502A of participant 1 in the GUI 508 (e.g., the GUI of participant 2 in this case) to indicate that participant 1 is an active speaker.

Continuing with the above example, the machine learning model 504 may access a second record of the records 510 that includes historical conference participant information associated with participant 3. However, the machine learning model 504 may predict from the second record that participant 3 should not be prioritized in the GUI 508. For example, the second record may indicate a lack of connection between participant 2 and participant 3. As a result, the machine learning model 504 may cause the selection logic 506 to not emphasize or de-emphasize the video feed 502C of participant 3 in the GUI 508 (e.g., the GUI of participant 2).

Further with the above example, the machine learning model 504 may access a third record of the records 510 that includes historical conference participant information associated with participant 4. The third record may indicate that participant 4 is an individual that is DHH, has used sign language in the past to communicate during another video conference, and/or is likely to use sign language in the current video conference. In some cases, the machine learning model 504 may detect gestures from participant 4 during the video conference, in the video feed 502D, via software-based image or audio analysis and processing, which may be associated with sign language. As a result, the machine learning model 504 may predict that participant 4 may be using sign language and should be a prioritized participant for participant 2, and may cause the selection logic 506 to emphasize the video feed 502D of participant 4 in the GUI 508 (e.g., the GUI of participant 2) to indicate that participant 4 is an active speaker (e.g., a silent active signer).

Thus, in some cases, the machine learning model 504 may determine multiple prioritized participants from the conference participants and emphasize, at the same time, the video feeds corresponding to the multiple prioritized participants. For example, for participant 2, the machine learning model 504 may determine that participants 1 and 4 should be prioritized participants from among the participants 1, 3, and 4. The machine learning model 504 can then cause the selection logic 506 to emphasize, at the same time, the video feeds corresponding to participants 1 and 4, without emphasizing (or de-emphasizing) the video feeds of participants that are not prioritized, such as participant 3. This may enable participant 2 to better understand a conversation involving participants 1 and 4, and may enable participants 1 and 4 to be better understood by participant 2. For example, if participant 2 is an individual that is DHH, participant 2 could better follow a conversation involving participant 1 and 4.

To make the predictions, the machine learning model 504 may be trained using historical conference participant information. In some cases, the historical conference participant information may indicate a connection to a participant, such as a participant being an individual that another participant should interact with, an individual that has similar interests to the other participant, an individual that is a member of a same team, group, or project as the other participant, or is a supervisor, manager, or teacher of the other participant. In some cases, the historical conference participant information may indicate a participant is an individual that is DHH and/or likely to use sign language. In some cases, the machine learning model 504 may be trained to detect a gesture associated with sign language in a video feed via software-based image or audio analysis and processing. The machine learning model 504 can be trained using a training data set including data samples from historical meetings or records in an organization, such as an organization chart, presentation, or other content. The training data set can enable the machine learning model to learn patterns, such as connections between participants and users of sign language. The training can be periodic, such as by updating the machine learning model on a discrete time interval basis (e.g., once per week or month), or otherwise. The training data set may derive from multiple participants (e.g., participants 1 to 4) or may be specific to a particular participant (e.g., participant 2). The machine learning model 504 may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

In some implementations, a conference participant may provide input that causes the conference participant to be a prioritized participant (e.g., the participant may self-select). For example, participant 4 may provide input that indicates that they are an individual that is DHH or a user of sign language. The selection logic 506 may receive the input and determine to select participant 4 as a prioritized participant based on the input (e.g., the input may cause the selection logic 506 to emphasize the video feed 502D of participant 4 in the GUI 508).

In some implementations, a filter 512 may be applied to prevent one or more particular conference participants from being a prioritized participant and/or from being displayed in the GUI 508. For example, the filter 512 may prevent participant 3 from being a prioritized participant for participant 2 during the video conference, and/or from being displayed in the GUI 508 (e.g., the GUI of participant 2), regardless of whether a connection exists between participant 3 and participant 2. In some cases, the filter 512 may be configured automatically by the system (e.g., using a machine learning model), and in some cases, the filter 512 may be configured by the participant using the GUI 508 (e.g., participant 2). The filter 512 may provide input to the machine learning model 504 so that a participant (e.g., participant 3) can be excluded from being a prioritized participant by the machine learning model 504, and as a result, prevented from being displayed via the selection logic 506.

In some implementations, a limiter 514 may be applied to limit or reduce the number of video feeds corresponding to conference participants that are displayed in the GUI 508. The limiter 514 may limit the number of video feeds regardless of the number of prioritized participants that are predicted by the machine learning model 504. For example, the limiter 514 may reduce the number of video feeds that are displayed in the GUI 508 to one video feed, regardless of whether two or more participants having video feeds are predicted to be prioritized. In some cases, the limiter 514 may be configured automatically by the system (e.g., using a machine learning model), and in some cases, the limiter 514 may be configured by the participant using the GUI 508 (e.g., participant 2). The limiter 514 may provide input to the machine learning model 504 so that the number of prioritized participants that are predicted does not exceed the number of video feeds that are limited by the limiter 514. As a result, the machine learning model 504 may prevent the selection logic 506 from displaying a number of video feeds greater than the number determined by the limiter 514.

Figure 6:
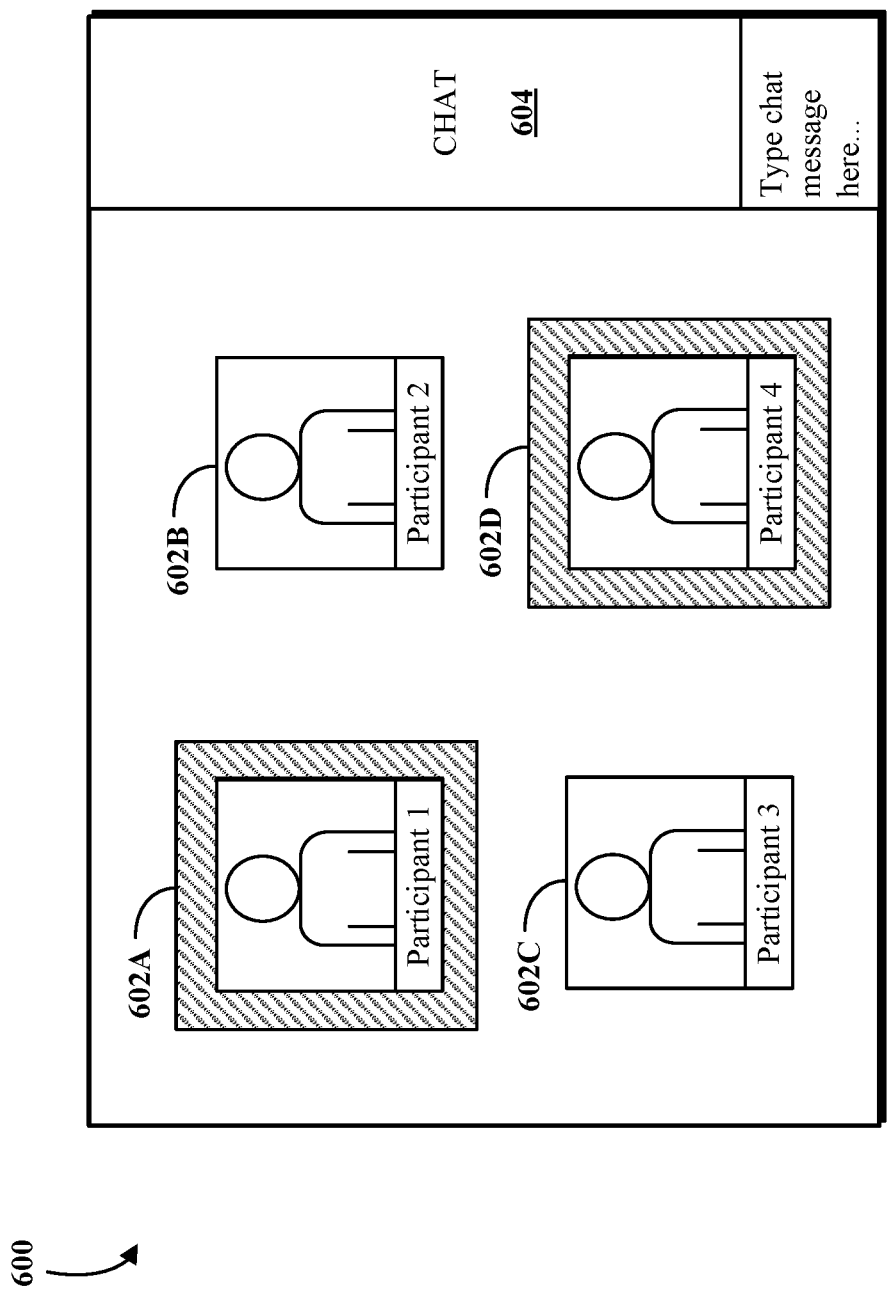
FIG. 6 is an illustration of an example of a graphical user interface (GUI) configured to emphasize a video feed corresponding to a prioritized participant by highlighting a participant tile.

FIG. 6 is an illustration of an example of a GUI 600 configured to emphasize video feeds corresponding to prioritized participants by highlighting participant tiles that may correspond to persons, animals, or objects. For example, the GUI 600 could correspond to the GUI 508 of FIG. 5. The GUI 600 could be configured for display to a user interface of a participant device, such as the second GUI associated with the participant device 404B of FIG. 4 (e.g., participant 2). The GUI 600 could be displayed during a video conference including multiple participants, such as participants 1 to 4 using the participant devices 404A to 404D during the video conference 402. For example, the GUI 600 could be configured for display to a user interface like the user interface 212. The GUI 600 may also include chat messages 604 that may be typed and exchanged between the conference participants during the video conference.

A system, such as the server device 406 and/or the participant devices 404A to 404D of FIG. 4, may run the prioritization software (e.g., the other software 318) to determine prioritized participants from the conference participants. For example, the system may use the machine learning model 408 or the machine learning model 504 to predict that participants 1 and 4 are prioritized participants for participant 2. The system can then emphasize, in the GUI 600 and during the video conference, the video feeds corresponding to participants 1 and 4. Emphasizing the video feeds may include highlighting participant tiles 602A and 602D associated with the video feeds of participants 1 and 4 in the GUI 600 (e.g., participant 2 is viewing the video feeds as thumbnails in a gallery). For example, the participant tiles 602A and 602D could be associated with the video feeds 502A to 502D in FIG. 5. In some implementations, highlighting may include changing a color in a background border of a participant tile associated with the video feed. For example, the participant tiles 602A and 602D may be highlighted in a predesignated color, such as green, which may be different from other participant tiles (e.g., the participant tiles 602B and 602C).

Figure 7:
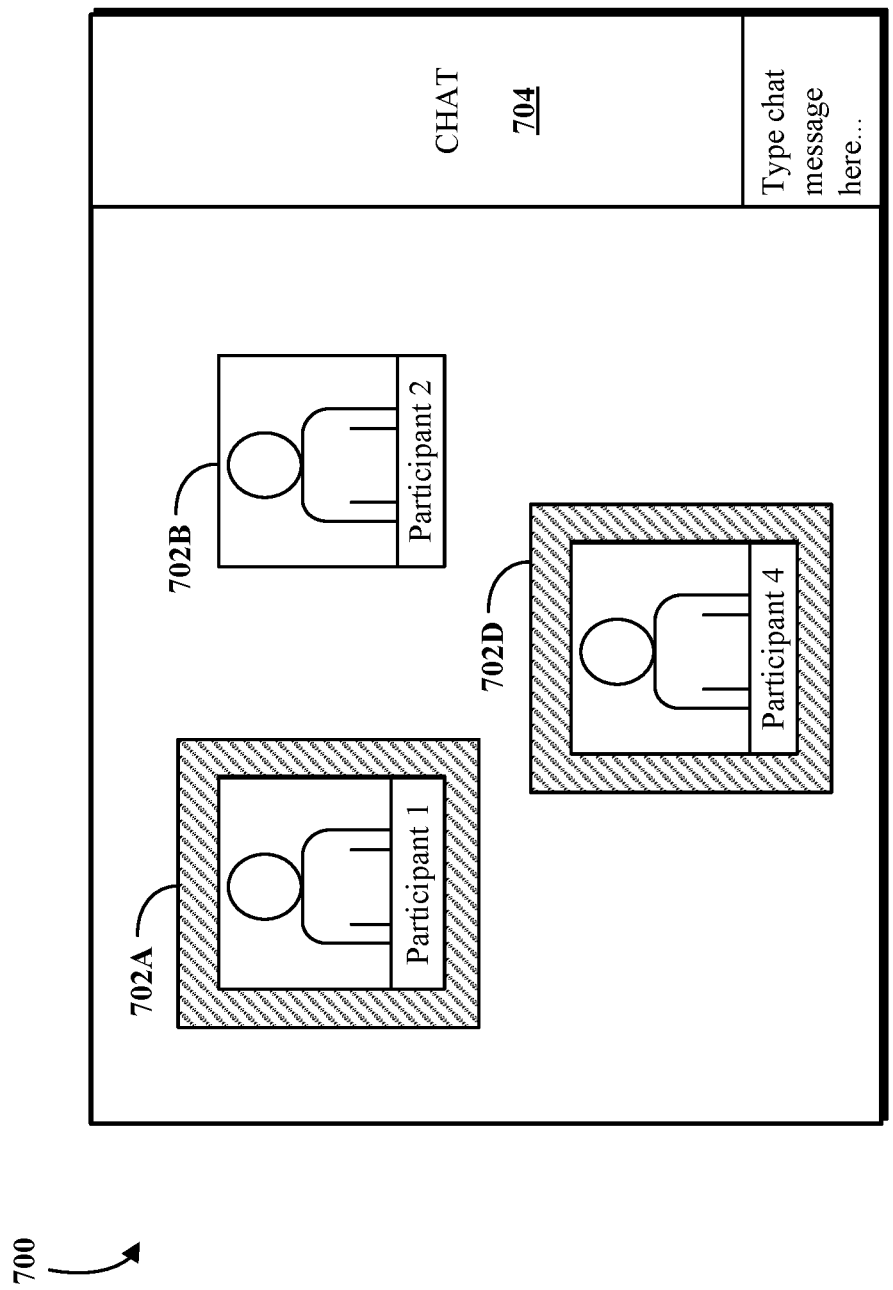
FIG. 7 is an illustration of an example of a GUI configured to filter or limit video feeds corresponding to conference participants.

FIG. 7 is an illustration of an example of a GUI 700 configured to filter or limit the video feeds corresponding to conference participants such as persons, animals, or objects. For example, the GUI 700 could correspond to the GUI 508 of FIG. 5. The GUI 700 could be configured for display to a user interface of a participant device, such as the second GUI associated with the participant device 404B of FIG. 4 (e.g., participant 2). The GUI 700 could be displayed during a video conference including multiple participants, such as participants 1 to 4 using the participant devices 404A to 404D during the video conference 402. For example, the GUI 700 could be configured for display to a user interface like the user interface 212. The GUI 700 may also include chat messages 704 that may be typed and exchanged between the conference participants during the video conference.

A system, such as the server device 406 and/or the participant devices 404A to 404D of FIG. 4, may run the prioritization software (e.g., the other software 318) to filter or limit the video feeds corresponding to conference participants in the GUI 700. For example, the system may use a filter (e.g., the filter 512) to prevent a particular conference participant from being a prioritized participant and/or from being displayed in the GUI 700, such as participant 3. As a result, the GUI 700 excludes a participant tile associated with the filter participant (e.g., the GUI 700 does not display a participant tile associated with participant 3). In another example, the system may use a limiter (e.g., the limiter 514) to limit or reduce the number of video feeds corresponding to conference participants that are displayed in the GUI 700. For example, the limiter may reduce the number of video feeds that are displayed in the GUI 700 to three video feeds. As a result, the GUI 700 displays a number of participant tiles up to the limit (e.g., participant tiles 702A, 702B, and 702D), and excludes participant tiles beyond the limit (e.g., the GUI 700 not displaying the participant tile associated with participant 3).

Figure 8:
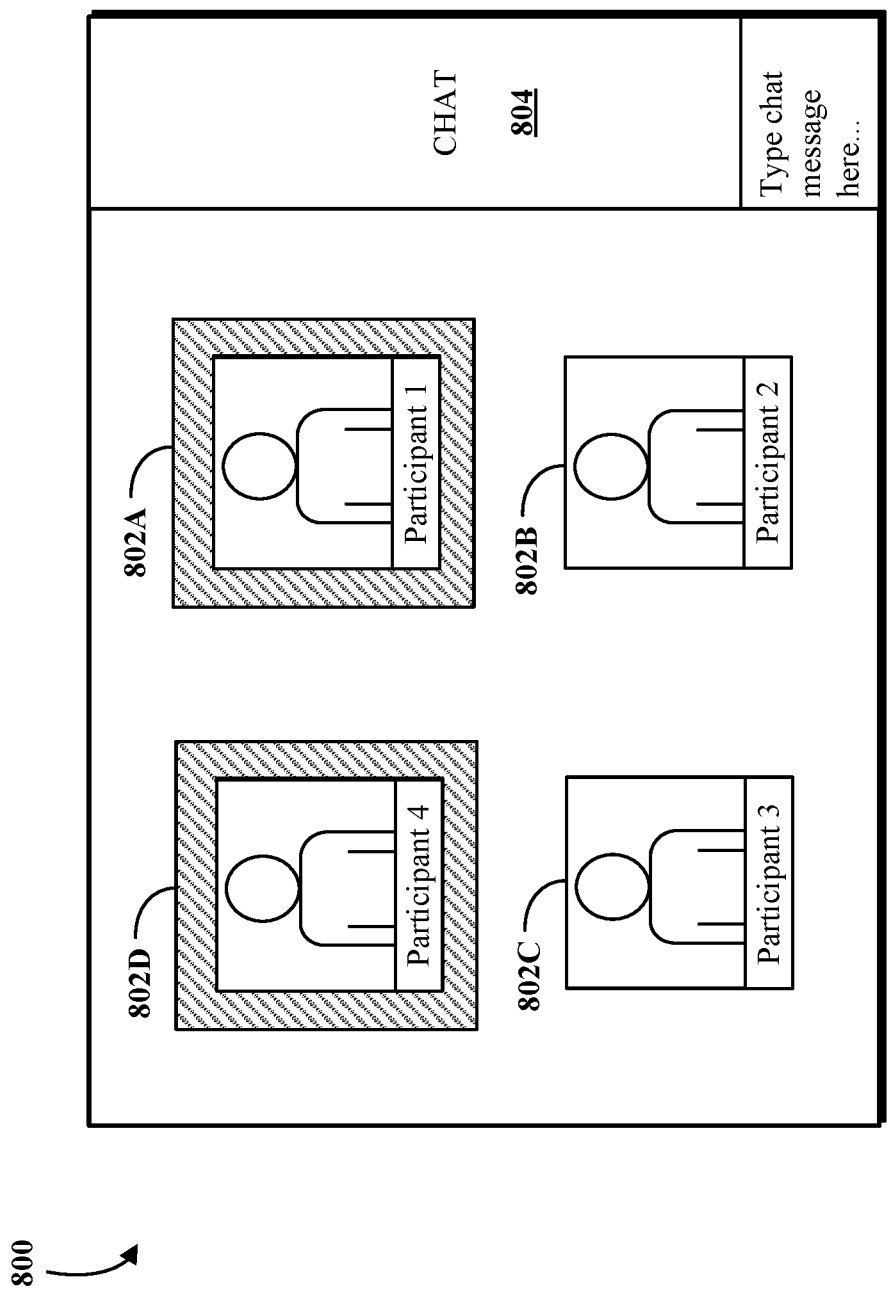
FIG. 8 is an illustration of an example of a GUI configured to apply an order to video feeds corresponding to conference participants.

FIG. 8 is an illustration of an example of a GUI 800 configured to apply an order to video feeds corresponding to conference participants such as persons, animals, or objects. For example, the GUI 800 could correspond to the GUI 508 of FIG. 5. The GUI 800 could be configured for display to a user interface of a participant device, such as the second GUI associated with the participant device 404B of FIG. 4 (e.g., participant 2). The GUI 800 could be displayed during a video conference including multiple participants, such as participants 1 to 4 using the participant devices 404A to 404D during the video conference 402. For example, the GUI 800 could be configured for display to a user interface like the user interface 212. The GUI 800 may also include chat messages 804 that may be typed and exchanged between the conference participants during the video conference.

A system, such as the server device 406 and/or the participant devices 404A to 404D of FIG. 4, may run the prioritization software (e.g., the other software 318) to determine prioritized participants from the conference participants and emphasize the video feeds of the prioritized participants by ordering their participant tiles above other participant tiles. For example, after determining participants 1 and 4 to be prioritized participants, the system may order participant tiles 802A and 802D, associated with the participants 1 and 4, above participant tiles of other participants, such as participant tiles 802B and 802C associated with the participants 2 and 3.

In some cases, the system may further order the participant tiles based on activity in the video conference, such as participants sending the chat messages 804. Sending a chat message could possibly indicate a participant is DHH. For example, the system may order participant tile 802D above participant tile 802A based on prioritized participant 4 sending a chat message (which could also be more recent than a chat message sent by prioritized participant 1). In another example, the system may order participant tile 802C above participant tile 802B, with participant tile 802B and 802C below participant tiles 802A and 802D, based on participant 3 sending a chat message (which could also be more recent than a chat message sent by participant 2).

Figure 9:
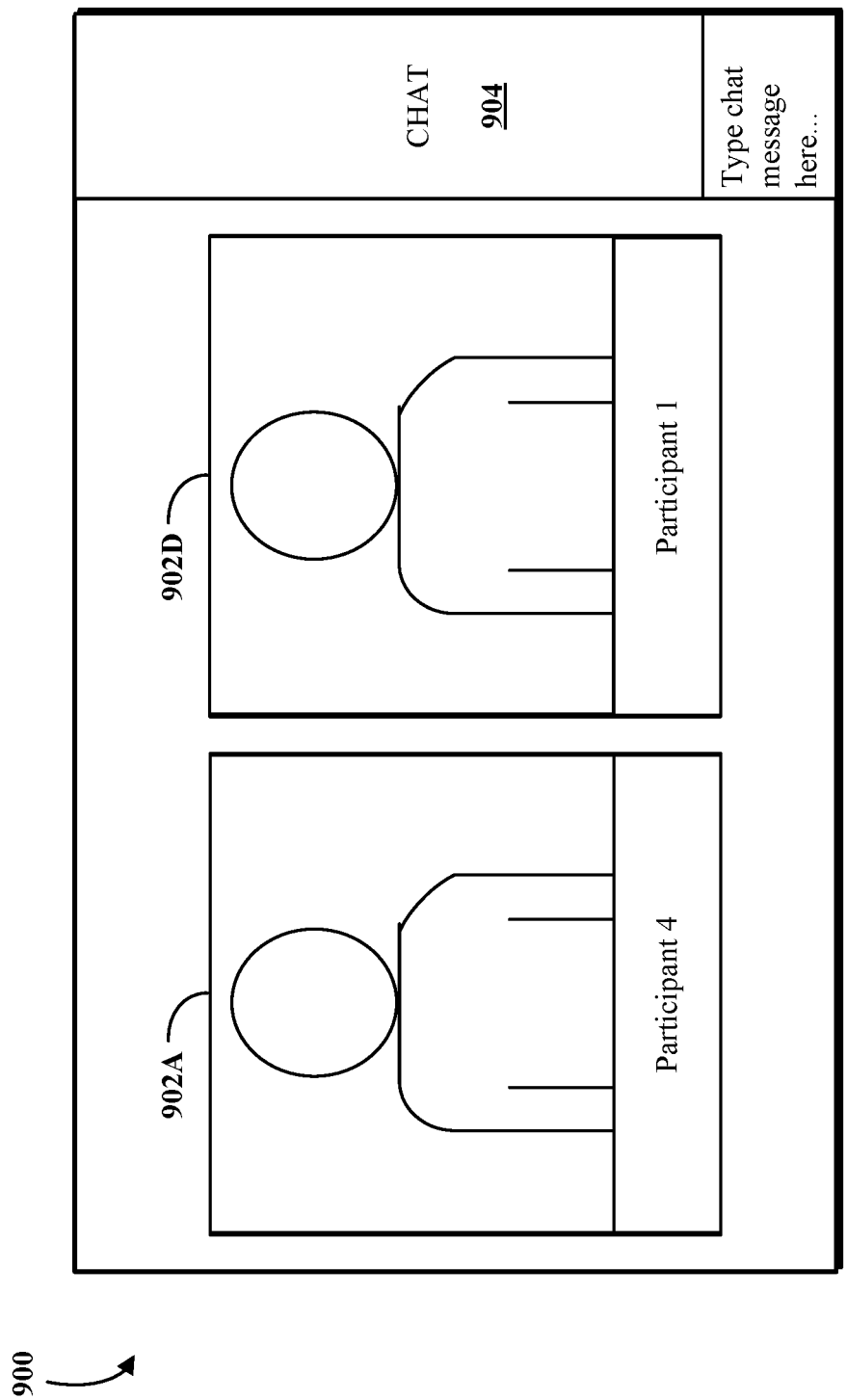
FIG. 9 is an illustration of an example of a GUI configured to emphasize a video feed corresponding to a prioritized participant by increasing a size of a participant tile.

FIG. 9 is an illustration of an example of a GUI 900 configured to emphasize a video feed corresponding to a prioritized participant by increasing a size of a participant tile correspond to a person, animal, or object. For example, the GUI 900 could correspond to the GUI 508 of FIG. 5. The GUI 900 could be configured for display to a user interface of a participant device, such as the second GUI associated with the participant device 404B of FIG. 4 (e.g., participant 2). The GUI 900 could be displayed during a video conference including multiple participants, such as participants 1 to 4 using the participant devices 404A to 404D during the video conference 402. For example, the GUI 900 could be configured for display to a user interface like the user interface 212. The GUI 900 may also include chat messages 904 that may be typed and exchanged between the conference participants during the video conference.

A system, such as the server device 406 and/or the participant devices 404A to 404D of FIG. 4, may run the prioritization software (e.g., the other software 318) to determine prioritized participants from the conference participants. For example, the system may use the machine learning model 408 or the machine learning model 504 to predict that participants 1 and 4 are prioritized participants for participant 2. The system can then emphasize, in the GUI 900 and during the video conference, the video feeds corresponding to participants 1 and 4. Emphasizing the video feeds may include increasing a size of participant tiles 902A and 902D associated with the video feeds of participants 1 and 4 in the GUI 900 (e.g., participant 2 is viewing the video feeds linked to active speakers, the participants 1 and 4, as opposed to thumbnails in a gallery). For example, the participant tiles 902A and 902D may be increased in size such that they dominate an area of the GUI 900 without displaying participant tiles of other participants (e.g., without displaying participant tiles for participants 2 or 3).

In some implementations, a participant can change between views provided by graphical user interfaces during a video conference. For example, during the video conference 402 of FIG. 4, a participant (e.g., participant 2) can configure a GUI to display like the GUI 600 at a first time (e.g., video feeds as thumbnails in a gallery), then configure the GUI to display like the GUI 900 at a second time (e.g., video feeds linked to active speakers). Further, activities during the video conference can also change the GUI. For example, during the video conference 402, a participant can configure a GUI to display like the GUI 600 at a first time (e.g., video feeds as thumbnails in a gallery), then an activity during the video conference, such as participant 4 sending a chat, can cause the GUI to change, resulting in a display like the GUI 800 (e.g., changing an order of the thumbnails).

Figure 10:
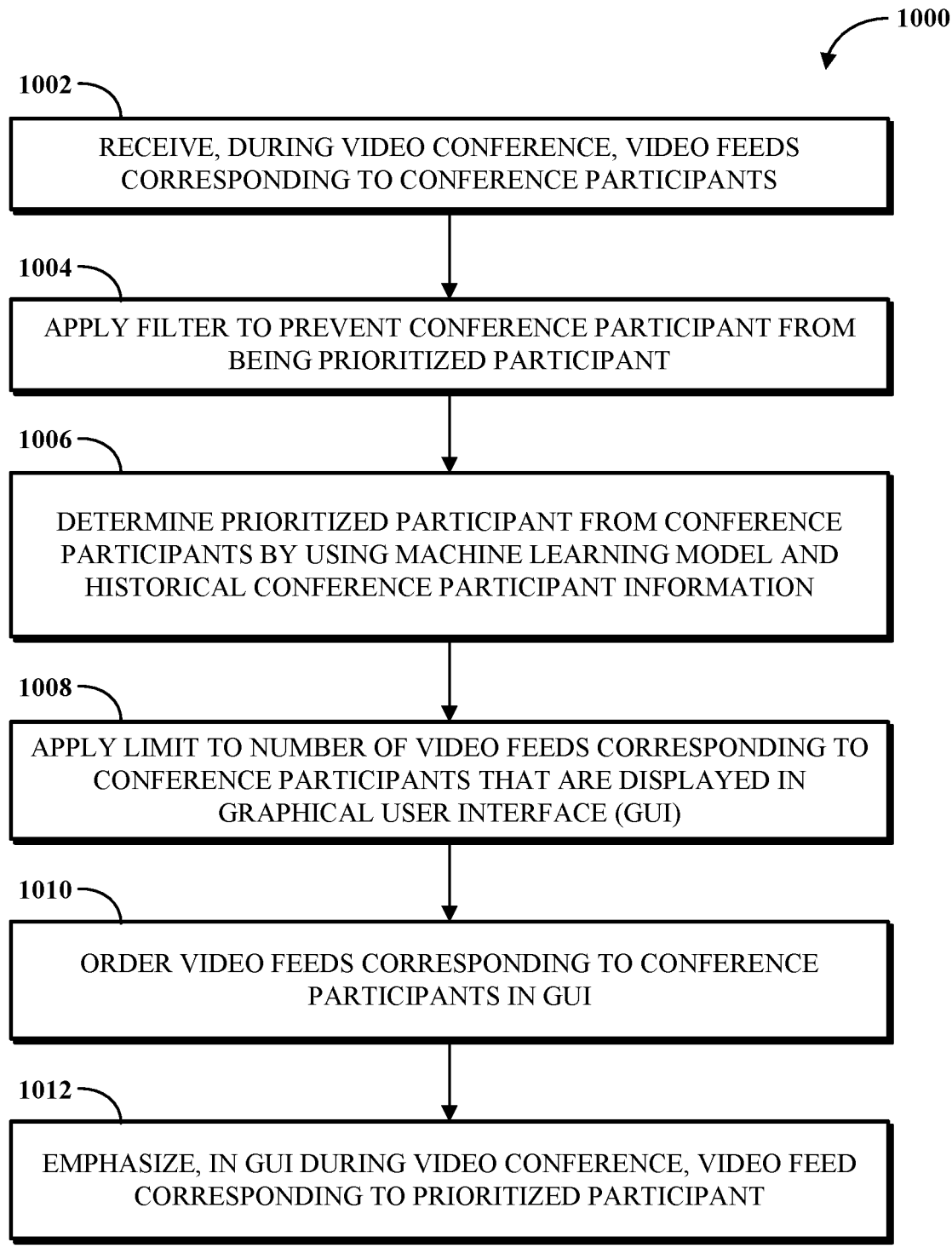
FIG. 10 is a flowchart of an example of a technique for determining a prioritized participant during a video conference.

To further describe some implementations in greater detail, reference is next made to examples of techniques which may be performed using a system for prioritizing a participant from other conference participants. FIG. 10 is a flowchart of an example of a technique 1000 for determining a prioritized participant during a video conference. The technique 1000 can be executed using computing devices, such as the systems, hardware, and software described with respect to FIGS. 1-8. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof. The technique 1000 may require authorization of an account administrator prior to use.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a system may receive during a video conference video feeds corresponding to conference participants. For example, the server device 406 and/or the participant devices 404A to 404D of FIG. 4, running the prioritization software, may receive during the video conference 402 video feeds corresponding to participants 1 to 4. The video feeds could correspond to the video feeds 502A to 502D of FIG. 5.

At 1004, the system may apply a filter to prevent a conference participant from being a prioritized participant and/or from being displayed in a GUI. For example, the system could apply the filter 512 of FIG. 5. The filter can prevent a participant from being a prioritized participant in the GUI of another participant, and/or from being displayed in the GUI, regardless of whether a connection exists between participants. In some cases, the filter may be configured automatically by the system (e.g., using a machine learning model), and in some cases, the filter may be configured by the participant using the GUI. The filter can provide input to a machine learning model (e.g., the machine learning model 408, or the machine learning model 504) so that a participant can be excluded from being a prioritized participant by the machine learning model.

At 1006, the system may determine a prioritized participant from the conference participants by using the machine learning model to predict the prioritized participant based on historical conference participant information. For example, the machine learning model may determine from the historical conference participant information that the prioritized participant is an individual that the participant should interact with, an individual that has similar interests to the participant, an individual that is DHH, an individual that is a member of a same team, group, or project as the participant, or is a supervisor, manager, or teacher of the participant. In some implementations, the machine learning model may determine from the historical conference participant information that a conference participant used sign language during another video conference. The machine learning model may access one or more records to obtain the historical conference participant information (e.g., the records 510). For example, the machine learning model may access a record to determine that a participant has a connection to another participant, or that a participant is likely to use sign language, and may detect gestures from the participant during the video conference, via software-based image or audio analysis and processing, that are associated with sign language. In some implementations, a conference participant may provide input that causes the conference participant to be a prioritized participant. For example, a conference participant may provide input that indicates that the conference participant is an individual that is DHH or using sign language to communicate (e.g., a silent active signer). The input may cause the conference participant to be determined to be a prioritized participant.

At 1008, the system may apply a limiter to limit or reduce the number of video feeds corresponding to conference participants that are displayed in the GUI. For example, the system could apply the limiter 514 of FIG. 5. The limiter can limit the number of video feeds regardless of the number of prioritized participants that are predicted by the machine learning model. For example, the limiter may reduce the number of video feeds that are displayed in the GUI to one video feed, regardless of whether two or more participants having video feeds are predicted to be prioritized. In some cases, the limiter may be configured automatically by the system (e.g., using a machine learning model), and in some cases, the limiter may be configured by the participant using the GUI 508 (e.g., participant 2). The limiter may provide input to the machine learning model so that the number of prioritized participants that are predicted does not exceed the number of video feeds that are limited by the limiter.

At 1010, the system may order video feeds corresponding to conference participants in the GUI. For example, after determining participants to be prioritized participants, the system may order participant tiles associated with the participants above participant tiles of other participants, such as in the GUI 800. In some cases, the system may further order the participant tiles based on activity in the video conference, such as participants sending chat messages. For example, the system may order one participant tile above another based on a prioritized participant associated with the participant tile sending a chat message (which could also be more recent than a chat message sent by a participant associated with the other participant tile). In another example, the system may further order participant tiles of non-prioritized participants below participant tiles of prioritized participants.

At 1012, the system may emphasize, in the GUI during the video conference, the video feed corresponding to the prioritized participant. The system may emphasize the video feed without emphasizing the video feeds of conference participants that are not prioritized participants. For example, emphasizing a video feed may include highlighting a participant tile associated with the video feed in the GUI or increasing a size of participant tile in the GUI. In some implementations, the machine learning model may determine multiple prioritized participants from the conference participants, and emphasize, at the same time, the video feeds corresponding to the multiple prioritized participants (e.g., multiple active speakers).

Some implementations may include a method, comprising receiving, during a video conference, video feeds corresponding to conference participants; determining a prioritized participant from the conference participants by using a machine learning model and historical conference participant information; and emphasizing, in a GUI during the video conference, the video feed corresponding to the prioritized participant. In some implementations, the determining the prioritized participant from the conference participants using the machine learning model comprises accessing a record including the historical conference participant information, the record indicating that the prioritized participant and a participant using the GUI have a connection in an organization. In some implementations, the determining the prioritized participant from the conference participants using the machine learning model comprises accessing a record including the historical conference participant information, the record indicating that the prioritized participant used sign language during another video conference. In some implementations, the determining the prioritized participant from the conference participants using the machine learning model comprises determining that the prioritized participant is using sign language during the video conference. In some implementations, the method may include training the machine learning model to detect a gesture associated with sign language in a video feed via software-based image or audio analysis and processing. In some implementations, emphasizing the video feed includes highlighting a participant tile associated with the video feed in the GUI. In some implementations, the method may include determining multiple prioritized participants from the conference participants and emphasizing the video feeds corresponding to the multiple prioritized participants. In some implementations, the method may include applying a filter that prevents a first conference participant from being the prioritized participant. In some implementations, the method may include limiting the number of video feeds corresponding to conference participants that are displayed in the GUI.

Some implementations may include an apparatus, comprising a memory and a processor configured to execute instructions stored in the memory to receive, during a video conference, video feeds corresponding to conference participants; determine a prioritized participant from the conference participants by using a machine learning model and historical conference participant information; and emphasize, in a GUI during the video conference, the video feed corresponding to the prioritized participant. In some implementations, the historical conference participant information indicates that the prioritized participant and a participant using the GUI are members of a same team in an organization. In some implementations, the machine learning model uses the historical conference participant information to predict that the prioritized participant is a user of sign language. In some implementations, emphasizing the video feed includes increasing a size of a participant tile associated with the video feed in the GUI. In some implementations, the processor is further configured to execute instructions stored in the memory to determine multiple prioritized participants from the conference participants as active speakers; and emphasize the video feeds corresponding to the multiple prioritized participants as active speakers without displaying the other conference participants. In some implementations, the processor is further configured to execute instructions stored in the memory to reduce the number of conference participants displayed in the GUI.

Some implementations may include a non-transitory computer readable medium storing instructions operable to cause one or more processors to perform operations comprising receiving, during a video conference, video feeds corresponding to conference participants; determining a prioritized participant from the conference participants by using a machine learning model and historical conference participant information; and emphasizing, in a GUI during the video conference, the video feed corresponding to the prioritized participant. In some implementations, the historical conference participant information indicates that the prioritized participant and a participant using the GUI have a student/teacher or supervisor/subordinate relationship. In some implementations, emphasizing the video feed includes changing a color in a background border of a participant tile associated with the video feed in the GUI. In some implementations, the operations further comprise determining at least two prioritized participants from the conference participants and emphasizing the video feeds corresponding to the at least two prioritized participants without emphasizing the video feeds of other conference participants. In some implementations, emphasizing the video feed includes ordering a participant tile associated with the video feed above another participant tile in the GUI.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, during a video conference, video feeds corresponding to conference participants;
determining, by a machine learning model trained on historical conference participant information, a prioritized participant that is hard of hearing from the conference participants wherein the machine learning model is configured to perform operations including:
accessing records indicating prior use of sign language, team membership, or organizational relationships; and
detecting, in real-time, gestures associated with sign language in a video feed via software-based image processing; and
highlighting, in a graphical user interface (GUI) during the video conference, a video tile of the video feeds corresponding to the prioritized participant to enable the prioritized participant to communicate with other conference participants.

2. The method of claim 1, wherein the determining the prioritized participant from the conference participants using the machine learning model comprises:
accessing a record including the historical conference participant information, the record indicating that the prioritized participant and a participant using the GUI have a connection in an organization.

3. The method of claim 1, wherein the determining the prioritized participant from the conference participants using the machine learning model comprises:
accessing a record including the historical conference participant information, the record indicating that the prioritized participant used sign language during another video conference.

4. The method of claim 1, wherein the determining the prioritized participant from the conference participants using the machine learning model comprises:
determining that the prioritized participant is using sign language during the video conference.

5. The method of claim 1, further comprising:
training the machine learning model to detect a gesture associated with sign language in a video feed via software-based image or audio analysis and processing.

6. The method of claim 1, wherein emphasizing the video feed includes highlighting a participant tile associated with the video feed in the GUI.

7. The method of claim 1, further comprising:
determining multiple prioritized participants from the conference participants and emphasizing the video feeds corresponding to the multiple prioritized participants.

8. The method of claim 1, further comprising:
applying a filter that prevents a first conference participant from being the prioritized participant.

9. The method of claim 1, further comprising:
limiting a number of video feeds corresponding to conference participants that are displayed in the GUI.

10. An apparatus, comprising:
a memory; and
a processor configured to execute instructions stored in the memory to:
  receive, during a video conference, video feeds corresponding to conference participants;
  determine, using a machine learning model trained on historical conference participant information, a prioritized participant that is hard of hearing from the conference participants wherein the machine learning model is configured to:
    access records indicating prior use of sign language, team membership, or organizational relationships; and
    detect, in real-time, gestures associated with sign language in a video feed via software-based image processing; and
  highlight, in a graphical user interface (GUI) during the video conference, a video tile of the video feeds corresponding to the prioritized participant to enable the prioritized participant to communicate with other conference participants.

11. The apparatus of claim 10, wherein the historical conference participant information indicates that the prioritized participant and a participant using the GUI are members of a same team in an organization.

12. The apparatus of claim 10, wherein the machine learning model uses the historical conference participant information to predict that the prioritized participant is a user of sign language.

13. The apparatus of claim 10, wherein emphasizing the video feed includes increasing a size of a participant tile associated with the video feed in the GUI.

14. The apparatus of claim 10, wherein the processor is further configured to execute instructions stored in the memory to:
  determine multiple prioritized participants from the conference participants as active speakers; and
  emphasize the video feeds corresponding to the multiple prioritized participants as active speakers without displaying the other conference participants.

15. The apparatus of claim 10, wherein the processor is further configured to execute instructions stored in the memory to:
  reduce a number of conference participants displayed in the GUI.

16. A non-transitory computer readable medium storing instructions operable to cause one or more processors to perform operations comprising:
  receiving, during a video conference, video feeds corresponding to conference participants;
  determining, by a machine learning model trained on historical conference participant information, a prioritized participant that is hard of hearing from the conference participants wherein the machine learning model is configured to perform operations including:
    accessing records indicating prior use of sign language, team membershit, or organizational relationships; and
    detecting, in real-time, gestures associated with sign language in a video feed via software-based image processing; and
  highlighting, in a graphical user interface (GUI) during the video conference, a video tile of the video feeds corresponding to the prioritized participant to enable the prioritized participant to communicate with other conference participants.

17. The non-transitory computer readable medium storing instructions of claim 16, wherein the historical conference participant information indicates that the prioritized participant and a participant using the GUI have a student/teacher or supervisor/subordinate relationship.

18. The non-transitory computer readable medium storing instructions of claim 16, wherein emphasizing the video feed includes changing a color in a background border of a participant tile associated with the video feed in the GUI.

19. The non-transitory computer readable medium storing instructions of claim 16, wherein the operations further comprise:
  determining at least two prioritized participants from the conference participants and emphasizing the video feeds corresponding to the at least two prioritized participants without emphasizing the video feeds of other conference participants.

20. The non-transitory computer readable medium storing instructions of claim 16, wherein emphasizing the video feed includes ordering a participant tile associated with the video feed above another participant tile in the GUI.

* * * * *